(12) United States Patent
Ruiz et al.

(10) Patent No.: US 8,042,777 B2
(45) Date of Patent: Oct. 25, 2011

(54) BRACKET AND METHOD OF MOUNTING AN OBJECT IN A RACK USING SAME

(75) Inventors: Gil Ruiz, McKinney, TX (US); Tim C. Miller, McKinney, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 390 days.

(21) Appl. No.: 12/332,807

(22) Filed: Dec. 11, 2008

(65) Prior Publication Data

US 2010/0108842 A1    May 6, 2010

Related U.S. Application Data

(60) Provisional application No. 61/111,387, filed on Nov. 5, 2008.

(51) Int. Cl.
*E04G 3/20* (2006.01)
(52) U.S. Cl. ......... 248/235; 211/103; 211/192; 248/300
(58) Field of Classification Search .................. 248/235, 248/239, 243, 244, 245, 247, 248, 300; 211/103, 211/187, 190, 191, 192; 361/825
See application file for complete search history.

(56) References Cited

U.S. PATENT DOCUMENTS

| | | | |
|---|---|---|---|
| 2,760,650 A * | 8/1956 | Franks | 211/187 |
| 5,593,137 A | 1/1997 | Johnson | |
| 6,123,203 A | 9/2000 | Gibbons | |
| 6,439,523 B1 * | 8/2002 | Chandler et al. | 248/300 |
| 6,462,961 B1 | 10/2002 | Johnson | |
| 6,510,955 B2 * | 1/2003 | Pellegrino | 211/192 |
| 2007/0187561 A1 * | 8/2007 | Xayoiphonh | 248/235 |
| 2008/0135705 A1 * | 6/2008 | Chuang | 248/243 |

FOREIGN PATENT DOCUMENTS

| | | |
|---|---|---|
| DE | 19647802 C1 | 1/1998 |
| EP | 0534578 A1 | 3/1993 |
| FR | 2259458 A1 | 8/1995 |
| WO | WO 2005/034302 A2 | 4/2005 |

* cited by examiner

*Primary Examiner* — Ramon Ramirez
(74) *Attorney, Agent, or Firm* — Muncy, Geissler, Olds & Lowe, PLLC

(57) ABSTRACT

A bracket includes a planar body portion having an edge and a surface, a flange extending generally perpendicularly from the edge, the flange including a plurality of mounting openings, and at least one finger projecting from the flange and along and spaced from the body portion surface. Also a method of using the bracket and an assembly including the bracket and a rack.

23 Claims, 5 Drawing Sheets

BRACKET AND METHOD OF MOUNTING AN OBJECT IN A RACK USING SAME

CROSS-REFERENCE TO RELATED APPLICATIONS

The present application claims the benefit of U.S. Provisional Patent Application No. 61/111,387, filed Nov. 5, 2008, the entire contents of which are hereby incorporated by reference.

FIELD OF THE INVENTION

The present invention is directed to a bracket for attaching an object to a mounting rack and toward a method of attaching an object to a mounting rack using the bracket, and, more specifically, toward a bracket for positioning and supporting an object to be mounted to a rack relative to the rack while the object is attached to the rack and toward a method of using same.

BACKGROUND OF THE INVENTION

It is well known to mount computer, electrical and telecommunications equipment or modules in racks. With reference to FIGS. 1-3, such racks may include spaced vertical posts 200 having generally parallel front walls 202 each having a plurality of openings 204. Modules 206 to be mounted in the rack include mounting brackets 208 projecting from opposite sides 210 thereof which mounting brackets 208 include a plurality of aligned openings 212. To mount the module 206 in the rack, the module 206 is lifted to an appropriate height relative to the rack, inserted between the vertical posts 200 until the mounting brackets 208 contact the posts 200, and positioned so the openings 212 in the mounting brackets 208 are aligned with the openings 204 in the front walls 202 of the rack. While being held in this position, screws, bolts or similar fasteners 214 are passed thought the aligned openings in the brackets 208 and posts 200 to secure the module 206 to the rack. Optionally, the openings in the rack and/or mounting bracket may be threaded to allow for the mounting of the objects without the use of nuts.

Installing equipment in such a rack, especially heavy equipment, is generally a two-person job. This is because it can be difficult for one person to hold the piece of equipment at a proper height and keep the various openings on the rack and module in alignment while inserting fasteners through the aligned openings and tightening them to secure the module to the rack.

Various holding devices, such as shown in U.S. Pat. No. 5,593,137 to Johnson, have been developed to lift and hold heavy rack-mountable equipment to allow one person to install the equipment. However, devices such as the Johnson lift are somewhat cumbersome and will not always be available when it become necessary to install or remove a piece of equipment from a rack.

SUMMARY OF THE INVENTION

These and other problems are addressed by embodiments of the present invention, a first aspect of which comprises a bracket that has a planar body portion with an edge, a surface and a flange that extends generally perpendicularly from the edge. The flange includes a plurality of mounting openings, and at least one finger projects from the flange and along the body portion surface and is spaced from the body portion.

Another aspect of the invention comprises a method that includes providing a rack having first and second parallel legs each including a plurality of spaced support openings, and providing a module having a first side and a second side configured for mounting in the rack, where a distance between the first side and the second side is less than a distance between the first and second legs. The method includes attaching first and second mounting brackets to the first and second sides of the module, the first and second mounting brackets each having a planar body portion with an edge and a flange extending generally perpendicularly from the edge. The flange includes a plurality of mounting openings, and at least one finger projects from the flange along and spaced from the body portion. The method further includes hanging the module on the rack by inserting the at least one finger of the flange of the first mounting bracket through a first support opening on the first leg of the rack and the at least one finger of the flange of the second mounting bracket through a first support opening on the second leg of the rack before attaching the module to the rack using fasteners. After inserting the fingers through the support openings, the method includes attaching the module to the rack by passing fasteners through aligned mounting openings on the module and support openings on the rack.

A further aspect of the invention comprises an assembly of a rack and a module. The rack has first and second parallel legs each including a plurality of spaced support openings, and the module has a first side and a second side and is configured for mounting in the rack. A distance between the first side and the second side of the module is less than a distance between the first and second legs of the rack. First and second mounting brackets are attached to the first and second sides of the module. The first and second mounting brackets each have a planar body portion with an edge and a flange extending generally perpendicularly from the edge. The flange includes a plurality of mounting openings, and at least one finger projecting from the flange along the body portion and spaced from the body portion. The at least one finger of the first mounting bracket extends through a first support opening on the rack first leg, and the at least one finger of the second mounting bracket extends through a first support opening on the second leg. Furthermore, at least one fastener extends through a mounting opening of the first support bracket and through a second support opening on the rack first leg aligned with the mounting opening of the first support bracket.

BRIEF DESCRIPTION OF THE DRAWINGS

These and other aspects and features of the present invention will be better understood after a reading of the following detailed description together with the attached drawings wherein.

DETAILED DESCRIPTION

Figure 1:
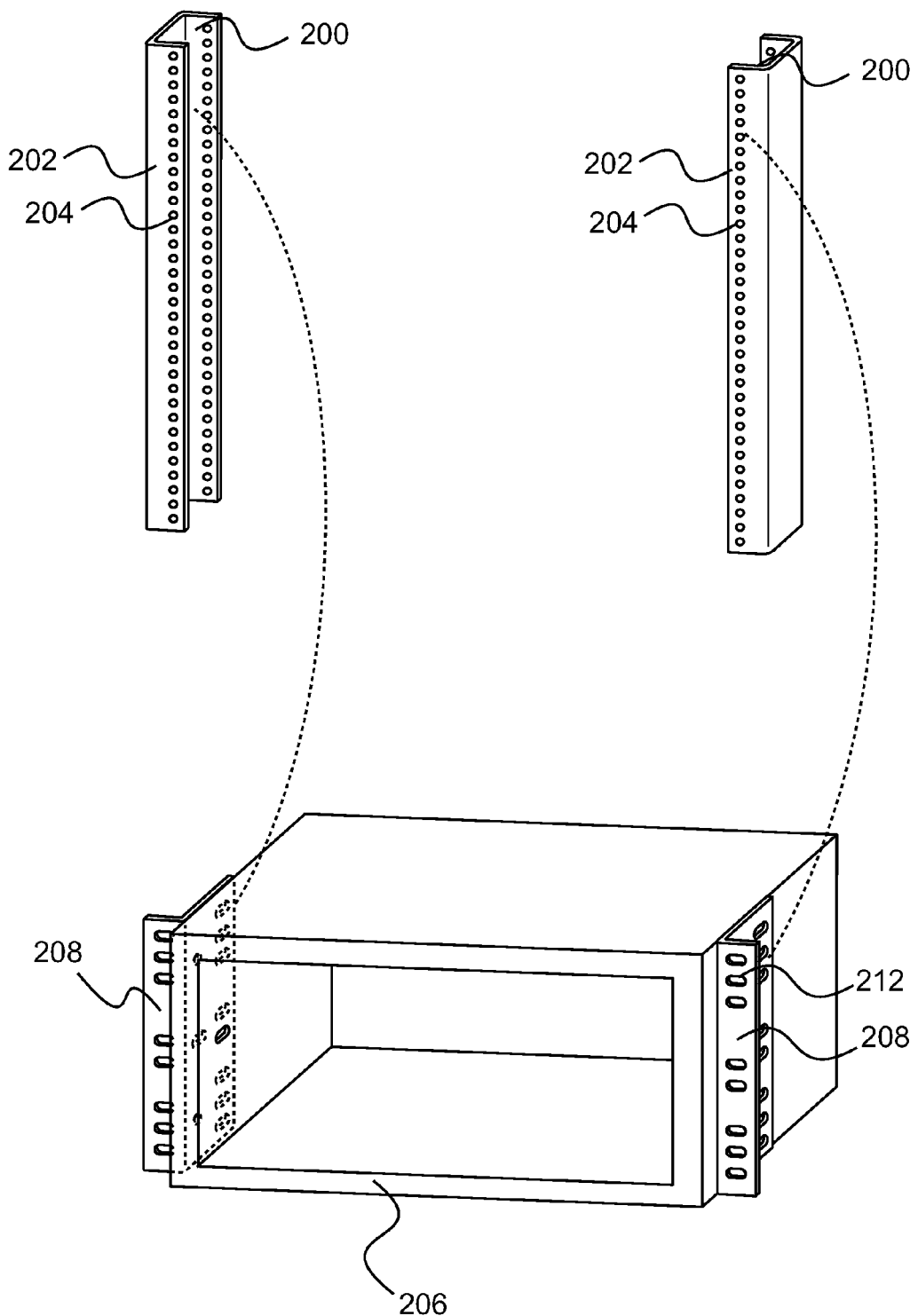
FIG. 1 is an exploded perspective view of a rack and a module to be mounted in the rack using conventional brackets.
Figure 2:
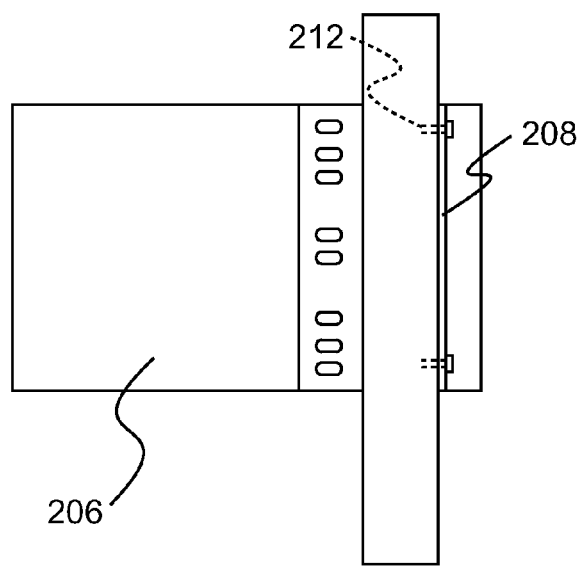
FIG. 2 is a side elevational view of the module of FIG. 1 with conventional mounting brackets attached thereto.
Figure 3:
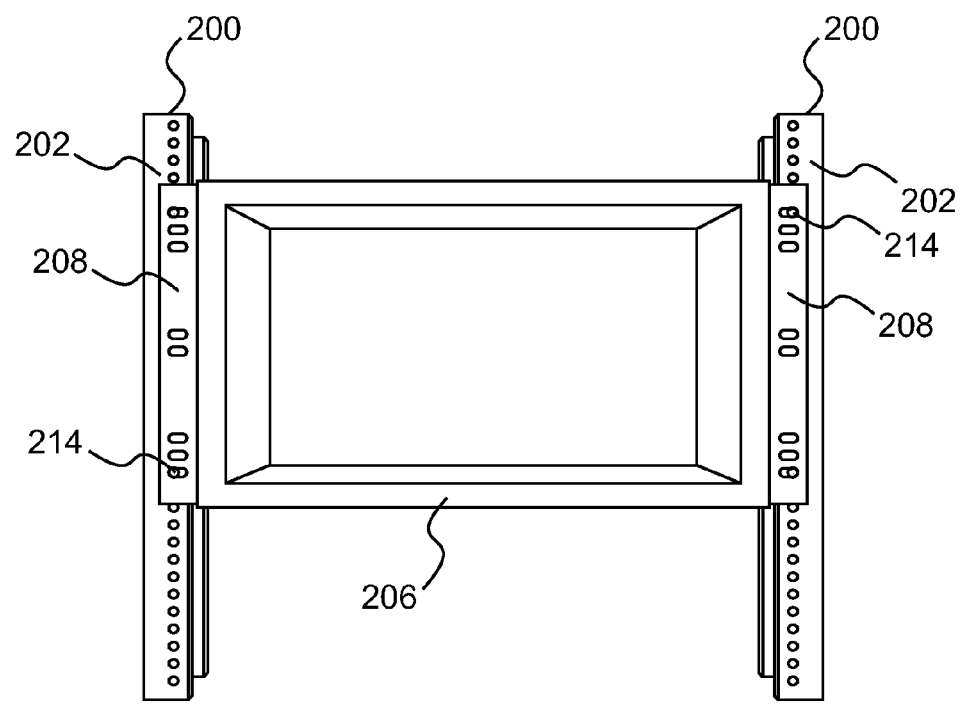
FIG. 3 is a front elevational view of the module of FIG. 1 mounted in the rack of FIG. 1 using conventional brackets.
Figure 5:
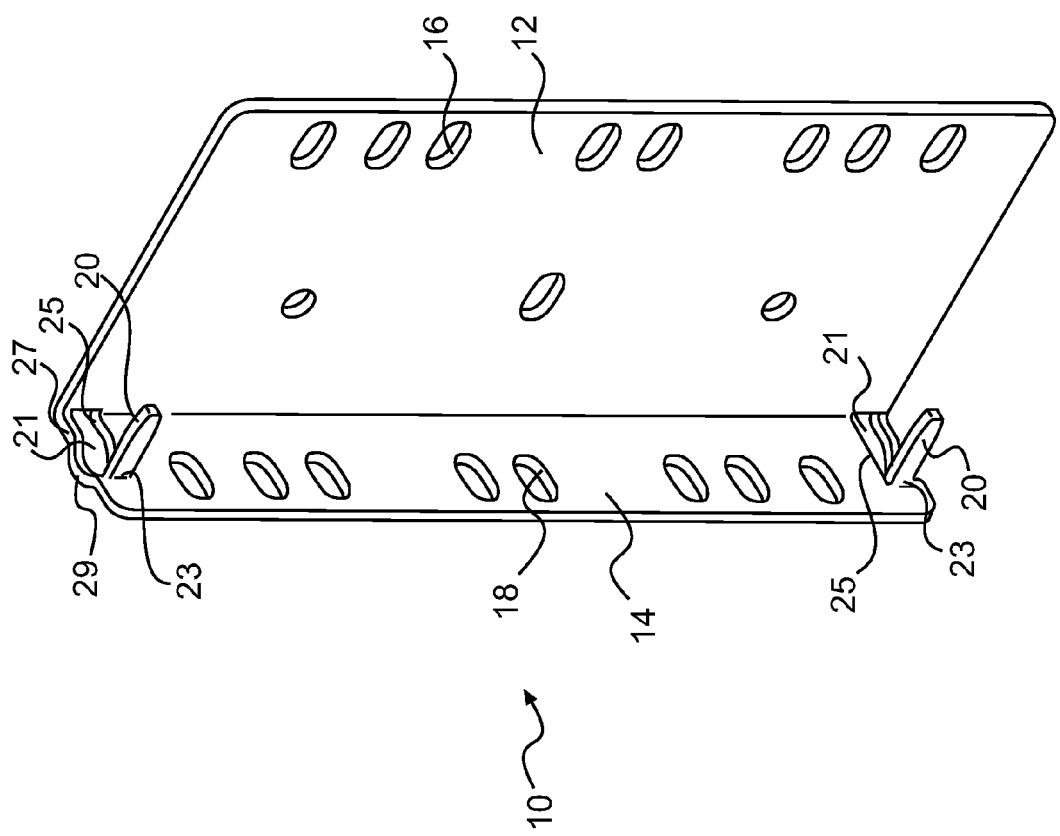
FIG. 5 is a rear perspective view of the mounting bracket of FIG. 4.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 4:
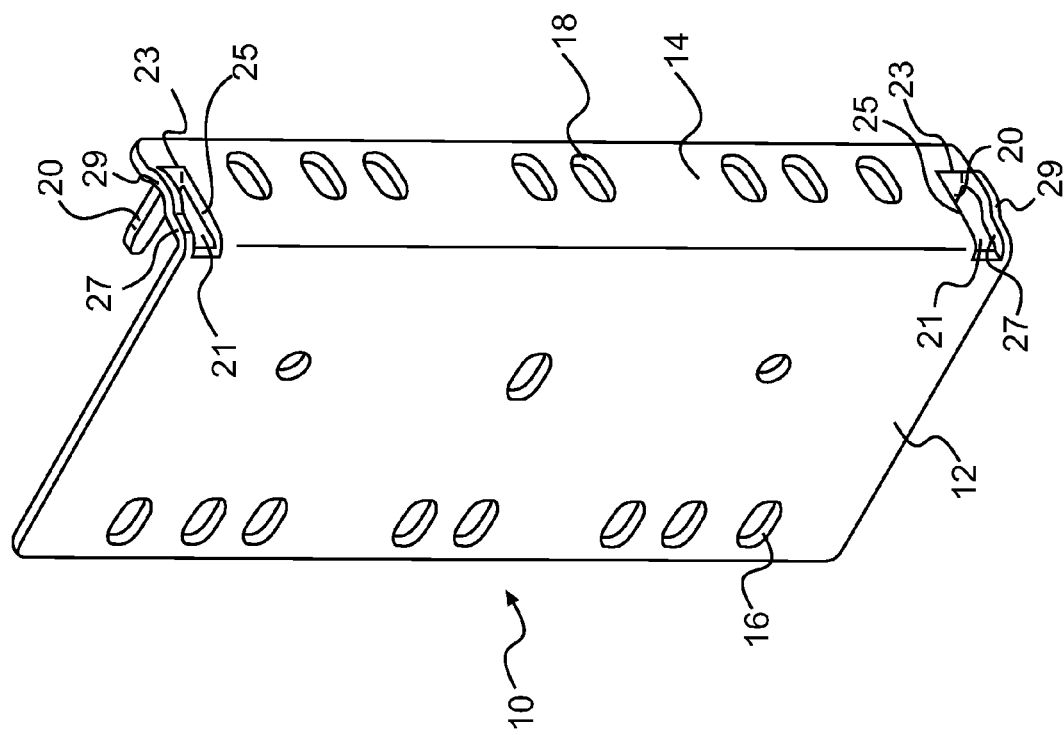
FIG. 4 is a front perspective view of a mounting bracket according to an embodiment of the present invention.

Referring now to the drawings, FIG. 4 illustrates a bracket 10 according to an embodiment of the present invention which bracket comprises a planar sheet of material, such as 0.09 inch thick aluminum, bent to form a body portion 12 and a flange 14. Attachment openings 16 are provided in body portion 12 for connecting the bracket 10 to a piece of equipment, and mounting openings 18 are provided in flange 14 for connecting the bracket to a mounting rack. Each flange 14 also includes first and second fingers 20 which are punched and bent from the material of flange 14 thereby producing a notch 21, and which fingers 20 extend generally perpendicularly from the flange 14 and along and spaced from bracket body portion 12. The fingers 20 are integrally formed with notch 21 and constitute an extension of a first edge 23 of notch 21. Notch 21 further includes a second edge 25 that lies substantially within the plane of flange 14 and a third edge 27 having an arcuate portion 29 that extends out of the plane of flange 14.

Figure 6:
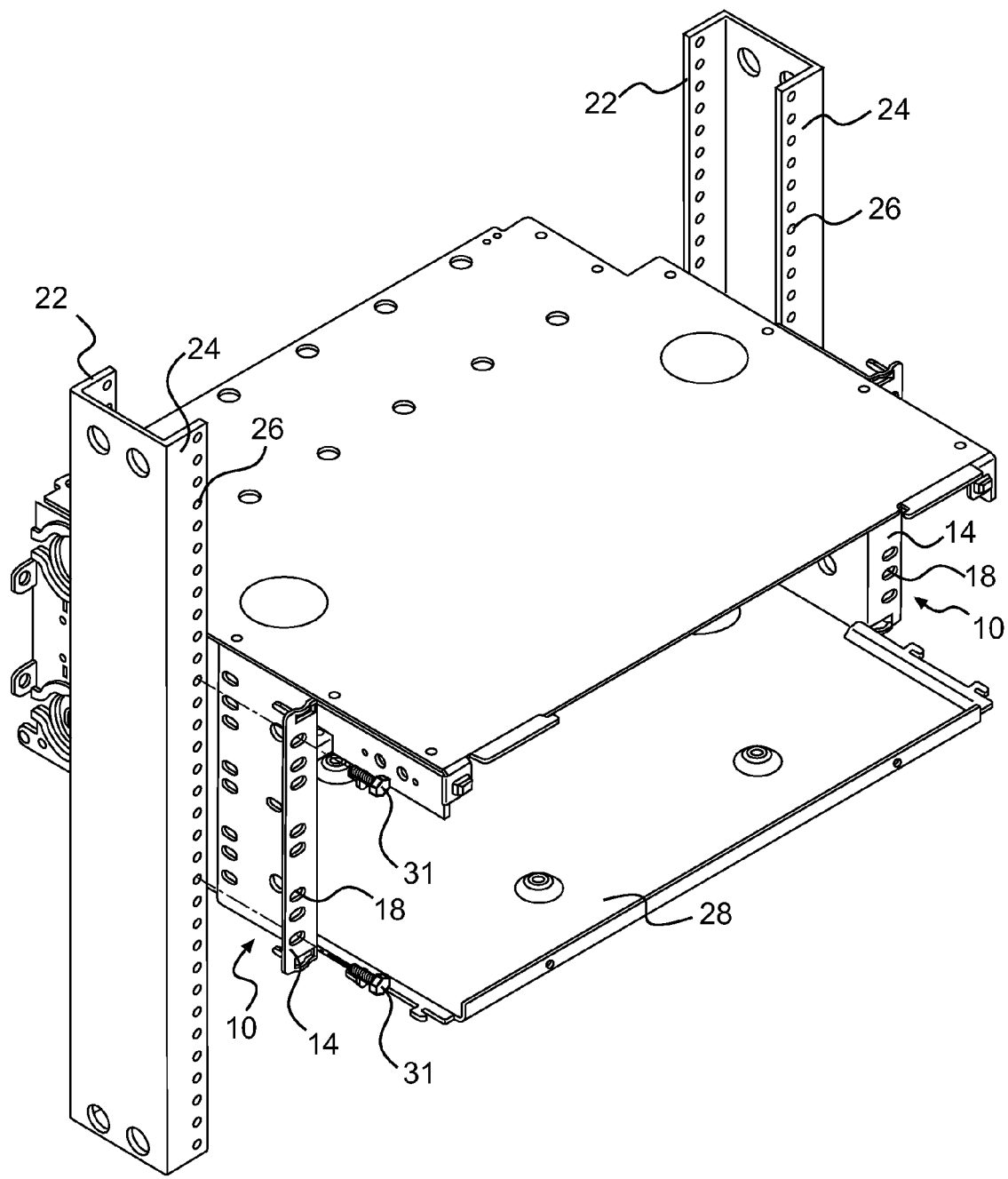
FIG. 6 is an exploded view of two mounting brackets according to FIG. 4 attached to a module positioned adjacent to a rack prior to being mounted in the rack.

A rack comprising two spaced vertical post members 22 having parallel front faces 24 is illustrated in FIG. 6. Front faces 24 include a plurality of evenly spaced support openings 26. A module 28 having brackets 10 mounted to opposite sides thereof is also illustrated in FIG. 6. While module 28 is generally shown as having an empty interior, those skilled in the art will appreciate that module 28 may be any type of electrical, computer, communications or other equipment that is conventionally mounted in racks.

The distance between adjacent support openings 26 on front faces 24 may be fixed or follow a repeating pattern. Without limitation, many conventional racks follow the EIA-310 rack specification in which two adjacent support openings are spaced by 0.625 inches followed by a third hole spaced from the second opening by 0.5 inches, after which this pattern repeats. The distance between adjacent mounting openings 18 on mounting bracket 10 is selected to follow this pattern so that appropriate mounting opening 18 on the mounting brackets 10 will align with the support openings 26 on the vertical post members 22 when the module 28 is positioned in the rack. The distance between fingers 20 and an adjacent mounting openings 18 on flange 14 is selected to align the mounting openings 18 on flange 14 with the support openings 26 on the vertical post members 22 of the rack when the fingers 20 are inserted in appropriate openings and will generally be a whole-number multiple of 0.125 inches.

In order to mount module 28 to post members 22, brackets 10 are placed with body portions 12 against the opposite sides of equipment 28 and secured thereto in a conventional manner. Module 28 is then lifted to a desired height relative to post members 22 and moved between post members 22 until fingers 20 enter support openings 26 on front faces 22 and flanges 14 of brackets 10 contact the front faces 24 of the vertical post members 22. Given the varying spacing of the openings on the rack discussed above, this arrangement also helps to ensure that the module is installed on the correct "rack unit" or position on the rack. Fingers 20 are sufficiently strong to support module 28 on vertical posts 22 while screws or appropriate fasteners 31 are passed through the aligned mounting openings 18 of flange 14 and support openings 26 of front face 24 to connect the brackets 10, and hence the module 28, to the rack. Beneficially, arcuate portion 29 on flange 14 provides an attachment location for a cover (not illustrated) that may be provided for coving the fasteners 31.

Because support brackets are generally attached to a piece of equipment near the front-to-rear center of gravity of the piece of equipment, little torque is applied to the piece of equipment, and the piece of equipment does not tend to rotate relative to the rack. For lightweight pieces of equipment, it may be possible to use only one finger 20 on each of the mounting brackets 10; however, providing two fingers 20 on each mounting bracket 10 provides additional security and allows the brackets to be used interchangeably on the left or right side of the module 28.

Figure 8:
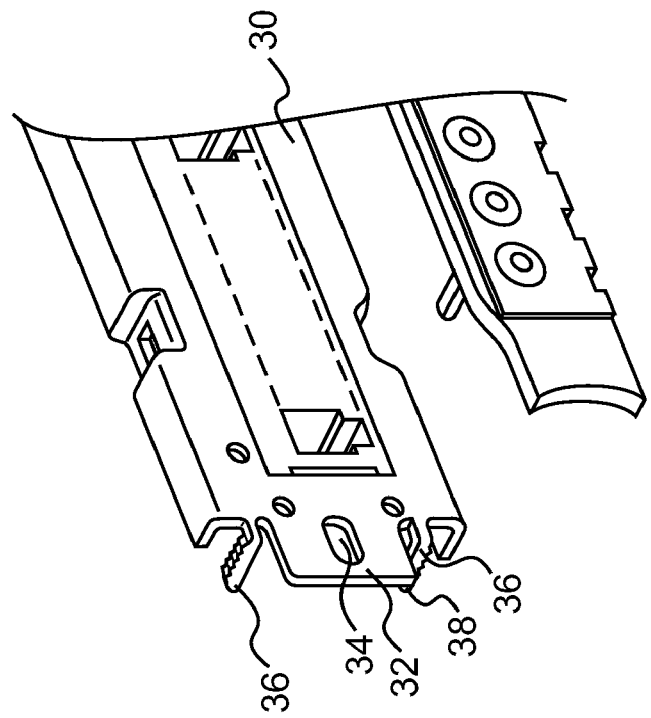
FIG. 8 is a perspective view of a portion of a third piece of equipment having an integral mounting bracket.
Figure 7:
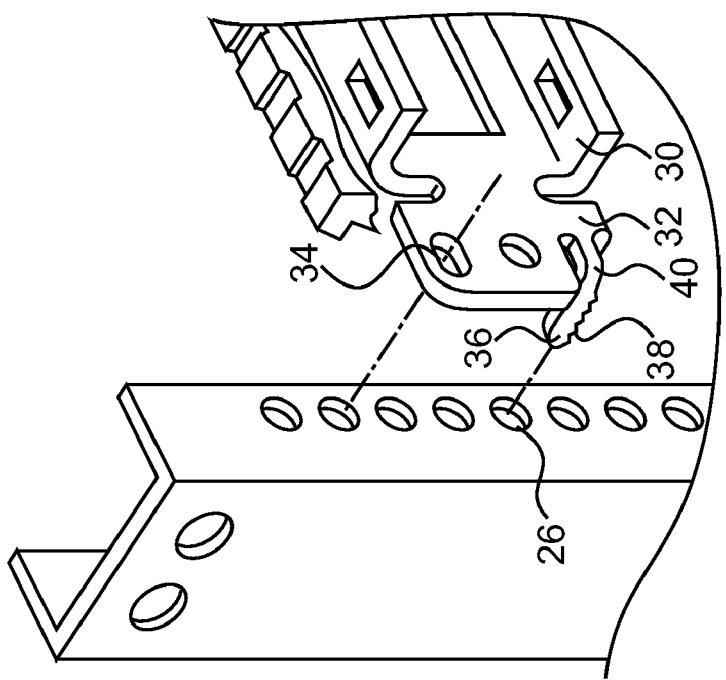
FIG. 7 is a perspective view of a portion of a second piece of equipment having an integral mounting bracket.

A second embodiment of the invention is illustrated in FIGS. 7 and 8. In these figures, a module 30 is provided with an integral mounting bracket 32 that includes mounting openings 34 alignable with support openings 26 in a rack. Mounting bracket 32 includes fingers 36 that allow module 30 to be temporarily supported on vertical post members 22 while being connected to the post members 22 by suitable fasteners (not shown) passing though the aligned mounting openings 34 of integral mounting bracket 32 and support openings 26 in a rack. A single mounting finger 36 is illustrated on one side of the module of FIG. 7 and a pair of mounting fingers 36 are illustrated on the module of FIG. 8.

The fingers 36 illustrated in FIGS. 7 and 8 include teeth 38 along their outer edges 40, the edges that will face away from each other when modules 30 are mounted in a rack. These teeth 38 engage the edges of the support openings 26 or the threads (not illustrated) that may be present in support openings 26 in vertical post members 22 to make it more difficult for the fingers 36 to slide out of support openings 26 when a module has been mounted. Smooth fingers 20 or toothed fingers 36 can be used on any of the embodiments disclosed herein.

The present invention has been described above in terms of several presently preferred embodiments. However, various modifications and additions to these embodiments will become apparent to those of ordinary skill in the art upon a reading of the foregoing description. It is intended that all such additions and modifications comprise a part of the present invention to the extent they fall within the scope of the several claims appended hereto.

We claim:

1. A bracket comprising:
a planar body portion having an edge and a surface;
a flange extending generally perpendicularly from said edge, said flange including a plurality of mounting openings arranged along a central longitudinal strip of said flange, said strip having a width defined by opposite edges of at least one of said plurality of mounting openings; and
at least one finger projecting from said strip between said opposite edges and along and spaced from said body portion surface.

2. The bracket of claim 1 wherein said planar body portion includes at least one attachment opening.

3. The bracket of claim 1 wherein said flange is planar and wherein said finger projects perpendicularly to the plane of the flange.

4. The bracket of claim 1 wherein said finger is planar.

5. The bracket of claim 1 wherein said flange has a length direction parallel to the edge of the body portion, said mounting openings have a width in the length direction and said at least one finger includes a width in the length direction, said width of said at least one finger being less than said mounting opening width in the length direction.

6. The bracket of claim 1 wherein said finger comprises an integral portion of said flange.

7. The bracket of claim 1 wherein adjacent ones of said mounting openings are spaced by a first amount or a second amount different from said first amount.

8. The bracket of claim 7 wherein said first amount is 0.5 inches and said second amount is 0.625 inches.

9. The bracket of claim 1 wherein said flange has a length direction parallel to the edge of the body portion and wherein said at least one finger comprises first and second fingers spaced from each other in the length direction.

10. The bracket of claim 9 wherein said spacing comprises a whole number multiple of 0.125 inches.

11. The bracket of claim 9 wherein said flange has a first end and a second end spaced from the first end in the length direction and said first finger is located proximate said first end and said second finger is located proximate said second end.

12. The bracket of claim 11 wherein each one of said plurality of mounting openings is located between said first finger and said second finger.

13. The bracket of claim 1 wherein said at least one finger includes at least one toothed edge.

14. The bracket of claim 1 wherein:
said flange has a first end and a second end and a length direction parallel to the edge of the body portion, said at least one finger comprising first and second fingers spaced from each other in the length direction, said first finger being located proximate said first end and said second finger being located proximate said second end;
said planar body portion includes at least one attachment opening;
said mounting openings have a width in the length direction and said first finger includes a width in the length direction, said width of said first finger being less than said mounting opening width in the length direction;
said flange includes a notch and wherein said first finger comprises an integral portion of said flange and an extension of a first edge of said notch;
said mounting openings are spaced by a first multiple of a given number and wherein a spacing between said first finger and a mounting opening adjacent to said first finger is equal to a second multiple of the given number;
each one of said plurality of mounting openings is located between said first finger and said second finger; and
said notch includes second and third edges extending from said first edge, said second edge lying in a plane of said flange and said second edge including an arcuate portion extending out of the plane.

15. A bracket comprising:
a planar body portion having an edge and a surface;
a flange extending generally perpendicularly from said edge, said flange including a plurality of mounting openings; and
at least one finger projecting from said flange and along and spaced from said body portion surface,
wherein said flange includes a notch and wherein said finger comprises an extension of a first edge of said notch.

16. The bracket of claim 15 wherein said notch includes second and third edges extending from said first edge, said second edge lying in a plane of said flange and said second edge including an arcuate portion extending out of the plane of said flange.

17. A method comprising:
providing a rack having first and second parallel legs each including a plurality of spaced support openings;

providing a module having a first side and a second side configured for mounting in the rack, a distance between the first side and the second side being less than a distance between the first and second legs;

attaching first and second mounting brackets to the first and second sides of the module, the first and second mounting brackets each comprising a planar body portion having an edge, a flange extending generally perpendicularly from the edge, the flange including a plurality of mounting openings, and at least one finger projecting from the flange along and spaced from the body portion;

hanging the module on the rack by inserting the at least one finger of the flange of the first mounting bracket through a first support opening on the first leg and the at least one finger of the flange of the second mounting bracket through a first support opening on the second leg before attaching the module to the rack using fasteners; and attaching the module to the rack by passing fasteners through aligned mounting openings on the module and support openings on the rack.

18. The method of claim 17 wherein the at least one finger comprises a first finger and a second finger and wherein the hanging the module on the rack comprises inserting the first finger and the second finger of the flange of the first mounting bracket through first and second spaced support openings on the first leg of the rack and inserting the first finger and second finger of the flange of the second mounting bracket through first and second spaced support openings on the second leg of the rack.

19. An assembly comprising:
a rack having first and second parallel legs, each including a plurality of spaced support openings;
a module having a first side and a second side configured for mounting in the rack, a distance between the first side and the second side being less than a distance between the first and second legs;
first and second mounting brackets attached to the first and second sides of the module, the first and second mounting brackets each comprising a planar body portion having an edge, a flange extending generally perpendicularly from said edge, said flange including a plurality of mounting openings, and at least one finger projecting from said flange along and spaced from said body portion;
said at least one finger of said first mounting bracket extending through a first support opening on the rack first leg and said at least one finger of said second mounting bracket extending through a first support opening on the second leg; and
at least one fastener extending through a mounting opening of said first support bracket and through a second support opening on the rack first leg aligned with the mounting opening of the first support bracket.

20. The assembly of claim 19 wherein said mounting openings are spaced by a first multiple of a given number and wherein a spacing between said finger and a mounting opening adjacent to said finger is equal to a second multiple of the given number.

21. The assembly of claim 19 wherein said flange has a length direction parallel to the edge of the body portion, said at least one finger comprises first and second fingers spaced from each other in the length direction, and each one of said plurality of mounting openings of said first bracket is located between said first finger and said second finger.

22. The assembly of claim 19 wherein said notch includes second and third edges extending from said first edge, said second edge lying in a plane of said flange and said second edge including an arcuate portion extending out of the plane.

23. The assembly of claim 19 wherein said at least one finger includes at least one toothed edge.

* * * * *